United States Patent
Ward et al.

(10) Patent No.: US 11,086,630 B1
(45) Date of Patent: Aug. 10, 2021

(54) FINISH EXCEPTION HANDLING OF AN INSTRUCTION COMPLETION TABLE

(71) Applicant: International Business Machines Corporation, Armonk, NY (US)

(72) Inventors: Kenneth L. Ward, Austin, TX (US); Susan Eisen, Round Rock, TX (US); Christopher M. Mueller, Round Rock, TX (US); Glenn O. Kincaid, Austin, TX (US); Dhivya Jeganathan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/802,679

(22) Filed: Feb. 27, 2020

(51) Int. Cl.
  *G06F 9/30* (2018.01)
  *G06F 9/38* (2018.01)

(52) U.S. Cl.
  CPC .......... *G06F 9/3855* (2013.01); *G06F 9/3865* (2013.01); *G06F 2209/481* (2013.01)

(58) Field of Classification Search
  None
  See application file for complete search history.

(56) References Cited

U.S. PATENT DOCUMENTS

| | | |
|---|---|---|
| 5,809,268 A | 9/1998 | Chan |
| 6,553,480 B1 | 4/2003 | Cheong et al. |
| 7,065,635 B1 * | 6/2006 | Sugumar ............ G06F 9/30094 712/217 |
| 8,386,753 B2 | 2/2013 | Eisen et al. |
| 10,853,072 B2 * | 12/2020 | Maruyama ............ G06F 9/355 |
| 2002/0194467 A1 * | 12/2002 | Reilly ................ G06F 9/3842 712/244 |
| 2009/0210659 A1 * | 8/2009 | Carlough ............ G06F 9/322 712/205 |
| 2014/0047219 A1 | 2/2014 | Gschwind et al. |
| 2014/0095848 A1 | 4/2014 | Gschwind et al. |
| 2015/0378731 A1 | 12/2015 | Lai et al. |
| 2019/0384608 A1 * | 12/2019 | Akizuki ............ G06F 9/3857 |
| 2020/0142697 A1 * | 5/2020 | Ward .............. G06F 9/30036 |

\* cited by examiner

*Primary Examiner* — Corey S Faherty
(74) *Attorney, Agent, or Firm* — Cantor Colburn LLP; Bryan Bortnick

(57) ABSTRACT

A computer system includes a dispatch stage configured to dispatch a plurality of instructions in a program order, and an issue stage configured to issue at least one instruction among the plurality of instructions. The computer system further includes an execution stage configured to execute the at least one instruction to generate a finish report and to determine the at least one instruction is one of an exception-free instruction or an exception instruction. In response to determining the exception-free instruction, a first finish report associated with the exception-free instruction is output to a completion stage. In response to determining the exception instruction, a second finish report associated with the exception instruction is output to an exception unit so as to halt output of the second finish report to the completion stage.

20 Claims, 4 Drawing Sheets

FINISH EXCEPTION HANDLING OF AN INSTRUCTION COMPLETION TABLE

BACKGROUND

The present invention relates generally to the field of instruction processing and more particularly to out-of-order superscalar multi-threaded microprocessor systems.

Traditional out-of-order microprocessors typically perform execution after instruction issue and prior to instruction completion. This traditional architecture facilities pipeline execution by holding instructions at the issue stage until all dependencies are satisfied before completing execution.

SUMMARY

According to a non-limiting embodiment described herein, a computing system comprises a dispatch stage configured to dispatch a plurality of instructions in a program order, and an issue stage configured to issue at least one instruction among the plurality of instructions. The computer system further includes an execution stage configured to execute the at least one instruction to generate a finish report and to determine the at least one instruction is one of an exception-free instruction or an exception instruction. In response to determining the exception-free instruction, a first finish report associated with the exception-free instruction is output to a completion stage. In response to determining the exception instruction, a second finish report associated with the exception instruction is output to an exception unit so as to halt output of the second finish report to the completion stage.

According to another non-limiting embodiment, a computer-implemented method is provided for controlling an order of an instruction pipeline of an out-of-order data processing system. The computer-implemented method comprises dispatching, via a dispatch stage, a plurality of instructions in a program order, issuing, via an issue stage, at least one instruction among the plurality of instructions, executing, via an execution stage, the at least one instruction to generate a finish report, and determining the at least one instruction is one of an exception-free instruction or an exception instruction. In response to determining the exception-free instruction, outputting a first finish report associated with the exception-free instruction to a completion stage. In response to determining the exception instruction, outputting a second finish report associated with the exception instruction to an exception unit so as to halt output of the second finish report to the completion stage.

According to yet another non-limiting embodiment, a computer program product is provided for controlling an electronic device to control an order of an instruction pipeline of an out-of-order data processing system. The computer program product comprises a computer readable storage medium having program instructions embodied therewith. The program instructions are executable by an electronic computer processor to control the electronic device to perform operations comprising dispatching, via a dispatch stage, a plurality of instructions in a program order, issuing, via an issue stage, at least one instruction among the plurality of instructions, executing, via an execution stage, the at least one instruction to generate a finish report, and determining the at least one instruction is one of an exception-free instruction or an exception instruction. In response to determining the exception-free instruction, outputting a first finish report associated with the exception-free instruction to a completion stage. In response to determining the exception instruction, outputting a second finish report associated with the exception instruction to an exception unit so as to halt output of the second finish report to the completion stage.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
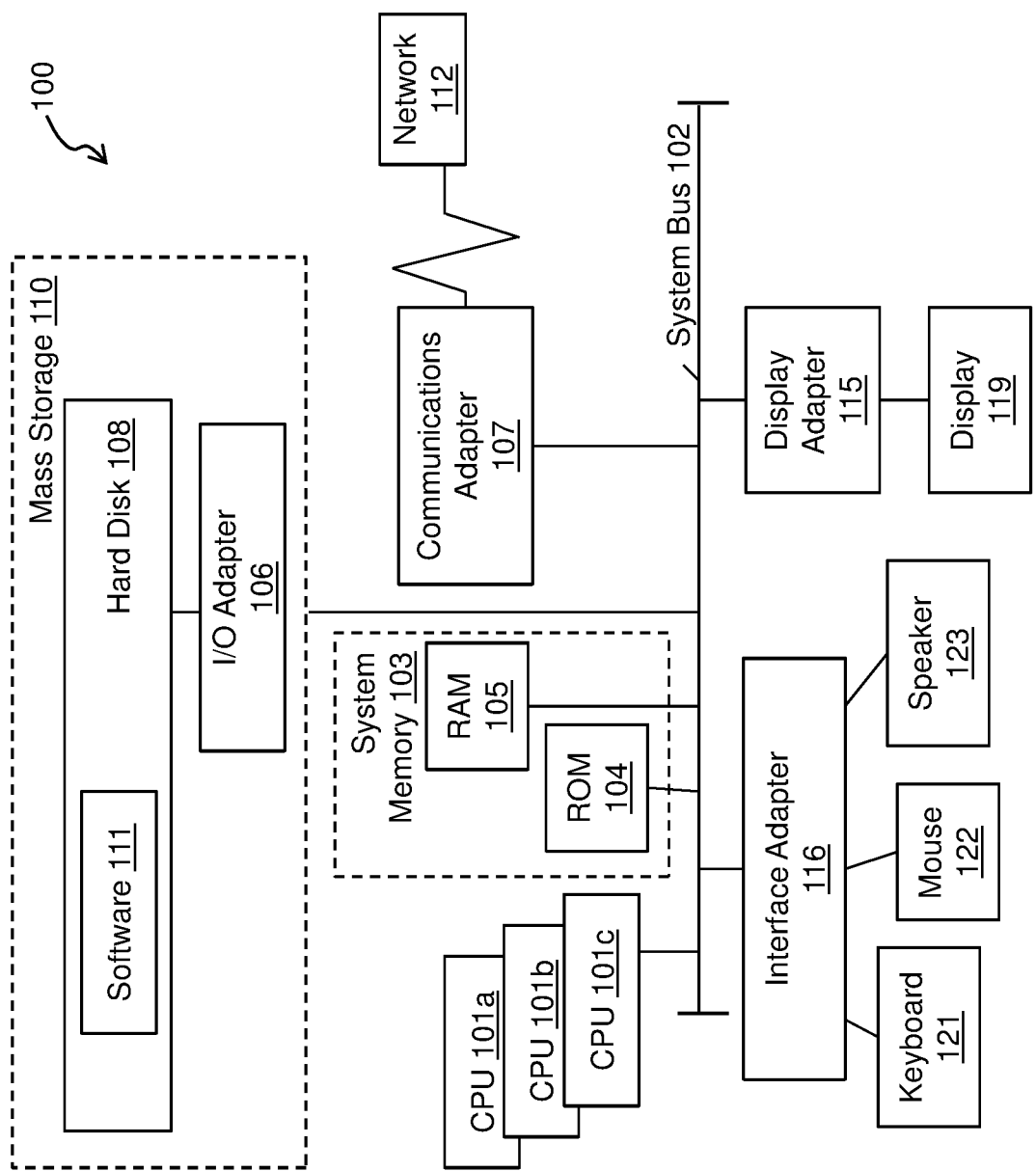
FIG. 1 is a block diagram of an example computer system for practicing the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Traditional out-of-order processing systems require valuable hardware resources to track the large complex instructions. These resources include mapper entries, issue queue entries, dependency tracking states, instruction tracking tables, and large out-of-order execution interfaces. Complex instructions can be highly serialized in nature, limiting the benefits of these out-of-order resources due to the limited instruction level parallelism.

Out-of-order instruction tracking tables are utilized to track instructions that are in-flight, record instruction finishes, and facilitate the completion of finished instructions. An execution stage included in an out-of-order execution pipeline may finish one or more instruction before the completion stage completes the instruction in the order they were dispatched. When an instruction has executed successfully (e.g., without a reject) it can be marked as finished. Reports of finished instructions are typically written into a completion table at the time the instruction is finished. When all of the instructions in a group are marked as finished and the group is the oldest for a given thread, the group can "complete." When a group completes, the results of all its instructions are made architecturally visible and the resources held by its instructions are released. In some instances, however, an instruction may finish (i.e., architecturally complete), but is associated with a completion exception that requires additional computing processing before it can be marked as finished and written into the completion table.

One or more non-limiting embodiment described herein provides an out-of-order data processing system capable of handling completion exceptions associated with a finished instruction. When an exception is detected, an exception identifier (ID) signal can be output at the same time as the finish report. The exception signal can then be utilized to block writing of the finish report into the completion table, which will effectively halt completion on the instruction associated with a given exception.

In at least one non-limiting embodiment, the out-of-order data processing system includes an exception processing unit configured to capture the finish report and its associated instruction pointer at the time of the exception. When more than one exception is received, the exception processing unit can identify the "age" or order of the multiple exceptions and select the oldest exception to be processed. In addition to a completion table pointer, the exception processing unit employs an exception pointer. When the completion table pointer is equal to the finish pointer for a given exception, the exception processing unit can proceed to process the exception, e.g., by invoking a flush of younger instructions, set bits in registers, etc. Once exception processing is complete, the exception processing unit can then send a finish report to the completion table to allow completion to continue.

In one or more non-limiting embodiments, the out-of-order data processing system includes a completion stage that utilizes an exception indicator to block writing the first finish report. For instance, in response to determining the exception-free instruction, a first finish report associated with the exception-free instruction is output to a completion stage. In response to determining the exception instruction, an exception indicator is sent with the first finish. When the instruction finishes with exception, the exception indicator is used to block writing the first finish report to the completion stage. The exception unit also receives the finish and exception indication so that it can process the exception. When the exception unit operates to complete the instruction, it sends a second finish report to the completion stage which is not blocked and can then be eligible for completion.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101a, 101b, 101c, etc. (collectively or generically referred to as processor(s) 101). The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate as described herein. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1.

Figure 2:
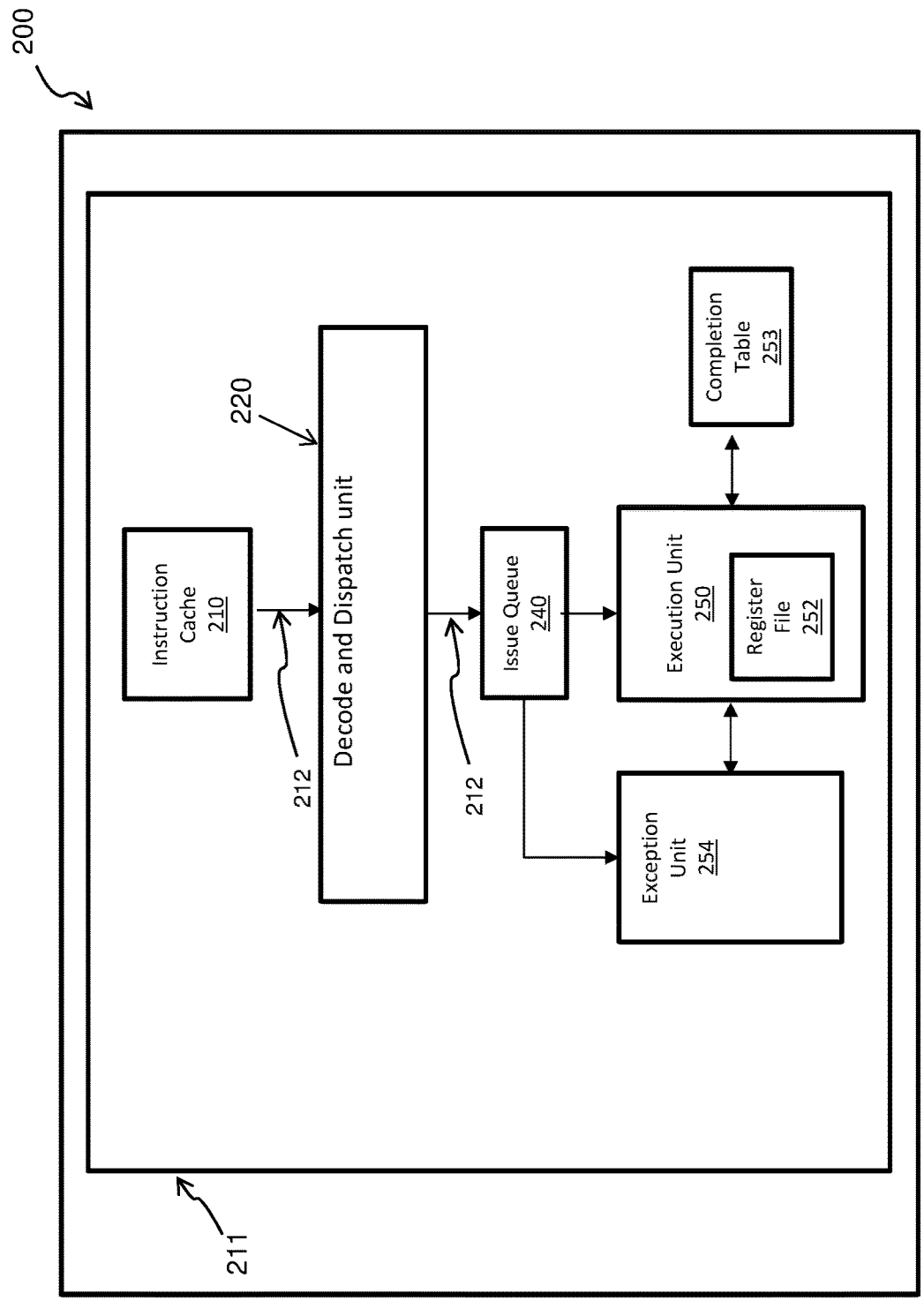
FIG. 2 is a block diagram of an instruction processing system in accordance with an embodiment.

Referring now to FIG. 2, a block diagram depicting a portion of an instruction processing system 200 in accordance with at least one embodiment of the present invention is shown. As depicted, the instruction processing system 200 includes an instruction pipeline 211, which each include an instruction cache 210, an instruction decoding and dispatch unit 220, an issue queue 240, and an execution unit 250. The pipeline 211 has a dedicated register file 252. The decoding and dispatch unit 220 and/or the execution unit 250 can each be constructed as an individual electronic hardware controller that includes memory and a processor configured to execute algorithms and computer-readable program instructions stored in the memory. The instruction processing system 200 may include other elements needed for executing computer instructions that are omitted for the sake of simplicity. Furthermore, the complexity of the depicted elements is generally omitted for the sake of simplicity.

The instruction cache 210 stores processing instruction(s) 212. In one or more embodiments, the instructions include an execution component that can be executed by the instruction processing system 200. In some embodiments, the instruction cache 210 stores one or more cache lines. One or more program counters (not shown) may provide an address to the instruction cache 210 indicating the current index of an executed program within memory. In response thereto, the instruction cache 210 immediately, or after retrieving a page or line of instructions from main memory, provides instructions 212 to the instruction decoding and dispatch unit 220.

The instruction decoding and dispatch unit 220 parses the instructions 212 and determines that the instructions 212 include a general purpose register (GPR) write. In one embodiment, the decoding and dispatch unit 220 decodes a portion of the instruction into a logical register type and a logical register number (i.e., logical register reference). The issue queue 240 queues the instructions 212 as well as the register file 252 and provides them as needed to the execution unit 250. The execution unit 250 executes the instructions 212 and stores data relating to the instruction in one or more of the register files 252. In one or more embodiments, the execution unit 250 executes a current instruction 212 by performing a modular arithmetic operation. In other embodiments, the execution unit 250 executes a current instruction 212 by accessing a register that is larger than a GPR.

In exemplary embodiments, when an instruction is decoded by the decoding and dispatch unit 220, it is determined if the instruction includes a GPR write micro operation that will only be accessed by the pipeline that executes the instruction. In these cases, the GPR write for the other pipelines is blocked, thereby reducing the power consumption of the processing system. In exemplary embodiments, the determination that data written by a GPR write micro operation will only be accessed by the pipeline that executes the micro operation is based on a determination that the micro operation is part of a complex instruction or that the micro operation is part of instruction in a dispatch group. As used herein, a complex instruction in an instruction that contains multiple micro operations.

In one or more non-limiting embodiments the instruction processing system 200 includes an exception unit 254 in signal communication with the execution unit 250. The exception unit 254 can be constructed as an individual electronic hardware controller that includes memory and a processor configured to execute algorithms and computer-readable program instructions stored in the memory.

Typically the execution unit 250 will finish an instruction (i.e., an "exception-free instruction") and generate a finish report, which is directly written into a completion table 253 at finish time. At times, however, an issued instruction may be associated with an exception (i.e., an "exception instruction") that requires the additional computing processing on the instruction before it can be completed. In one or more embodiments of the invention, the exception unit 254 is configured to manage the exception before the corresponding instruction is prematurely written into the completion table 253.

In one or more non-limiting embodiments, when an exception is detected, an exception detection signal can be generated by the execution unit 250 at the same time as the finish report. The finish report can then be provided to the exception unit and the completion table 253. An exception indicator corresponding to the detected exception can be used as a control signal to block writing the finish into the completion table 253. The exception unit 250 can capture the ITAG for the finish with exception and age it against any other exceptions being processed to find the oldest per thread. In this manner, the exception unit 254 can hold or buffer the finish report until the additional processing associated with the exception is finished. This buffering process effectively prevents premature completion on the instruction associated with the exception. Once the additional processing associated with the exception is finished, the exception unit 254 can output the finish report such that the instruction can be properly completed in order.

Figure 3:
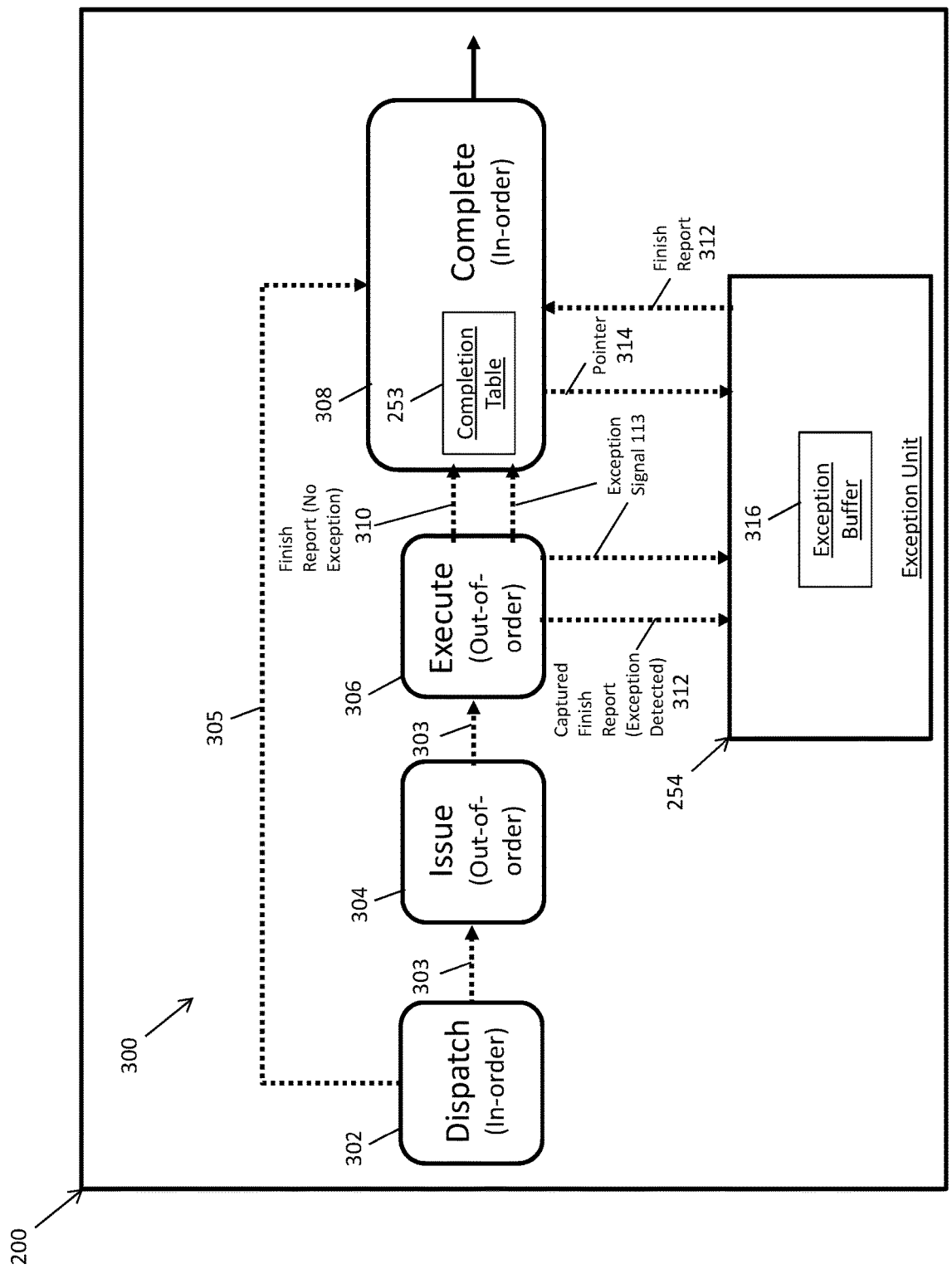
FIG. 3 is a block diagram illustrating out-of-order execution pipeline in signal communication with an exception unit configured to manage an exception corresponding to a dispatched instruction according to a non-limiting embodiment.

FIG. 3 is a block diagram illustrating an out-of-order execution pipeline 300 including in an instruction processing system 200 according to a non-limiting embodiment. The out-of-order execution pipeline 300 includes a dispatch stage 302, an out-of-order issue stage 304, an out-of-order execution stage 306, and a completion stage 308. Any one of the dispatch stage 302, the out-of-order issue stage 304, the out-of-order execution stage 306, and the completion stage 308 can be constructed as an electronic hardware controller that includes memory and a processor configured to execute algorithms and computer-readable program instructions stored in the memory. In addition, the dispatch stage 302, out-of-order issue stage 304, out-of-order execution stage 306, a completion stage 308 can be constructed as individual stages of a single controller.

A dispatch queue (not illustrated) can maintain a dispatch queue instructions (sometimes referred to as "tasks") that are queued in a particular program order. Accordingly, the dispatch stage dispatches the instructions 303 in-order (i.e. according to the program order) to the out-of-order issue stage 304. In addition to dispatching the instructions to the issue stage 304, the dispatch stage 302 also delivers a unique dispatched instruction tag (ITAG) 305 that identifies a given dispatched instruction to the completion stage 308. The completion stage 308 stores the ITAGs 305 in a completion table 253 so as to determine the original program order of the dispatched instructions 303. In this manner, the completion stage 308 can re-order each finished instruction and complete the finished instructions according to the original program order.

The out-of-order issue stage 304 can hold the instructions 303 in an issue queue until all their required operands are available. From the out-of-order issue stage 304, instructions 303 can be issued opportunistically to the out-of-order execution stage 306. In other words, the instructions 303 can be issued out-of-order and subsequently executed and finished (e.g., flushed or allowed to execute) out-of-order before being completed in order at the completion stage 308.

The execution stage 306 is capable of executing the instructions 303 issued by the issue stage out-of-order, and generate a finish report for each executed instruction. When performing the execution process, the execution stage 306 can determine whether a given instruction excludes any exceptions (i.e., is an "exception-free instruction"), or whether a given instruction is associated with an exception (i.e., is an "exception instruction"). Accordingly, the execution stage 306 can invoke the exception unit 254 to capture the finish report 312 associated with an exception instruction before it is delivered to the completion stage 308. In this manner, the completion of the exception instruction is effectively delayed as described in greater detail below.

The completion stage 308 operates to re-order the instructions into program order, which are then completed. Results obtained from the completion stage 308 can provide various execution information regarding the current completed instruction including, but not limited to, the type of the current completed instruction, the logical registers associated with current completed instruction, which registers to read, the registers which are to be written, the number of cycles needed to perform post-completion, and the number of cycles needed for an instruction to determine it is next-to-complete (NTC). This execution information (e.g., finish reports) can be stored in a completion table 253 and then utilized to re-order and process the instructions in the order they were dispatched. For example, when no exceptions are detected, execution information and finish reports can be written directly into a data structure (e.g., a global completion table) at dispatch time, the data structure can be read at completion time, and the read execution information can be transferred to a post-completion execution unit. In other examples, the execution information can be determined from results obtained during the dispatch stage 302.

In one or more non-limiting embodiments, the out-of-order execution pipeline 300 is in signal communication with the exception unit 254. The exception unit 254 is configured to capture a finish report 312 (corresponding to an instruction associated with an exception) at the time of detecting an exception associated with a given instruction. In this manner, the exception unit 254 prevents the finish report 312 associated with the instruction from being prematurely delivered to the completion stage 308.

For example, when a given instruction 303 is identified as an exception-free instruction, the execution stage 306 outputs a corresponding finish report 310 to the completion stage 308. When, however, a given instruction 303 is identified as an exception instruction, the execution stage 306 outputs an exception detection signal 113 to the completion stage 308 and the exception unit 254. In response to receiving the exception detection signal 313, the exception unit 254 is invoked and the execution stage 306 delivers the captured finish report 312 to the exception unit 254. The completion stage 308 will not complete the exception instruction until it is finished by the exception unit 254. In this manner, completion of the exception instruction is effectively delayed until the exception unit 254 provides the completion stage 308 with the captured finish report 312.

In one or more non-limiting embodiments, the exception unit 254 utilizes an NTC pointer 313 provided by the execution stage 306 to synchronize the timing at which to finish an exception instruction. The completion stage 308 outputs an NTC pointer 313 for each instruction in the completion table that is next-to-complete. In other words, the NTC pointer 313 informs the exception unit 254 of the current instruction that is waiting for a corresponding finish report so that the instruction can complete.

The exception unit 254 includes an exception buffer 316 that buffers and organizes the exception instructions and corresponding captured finish reports 312. When an exception instruction is detected, the exception unit 254 holds the captured finish report 312 in the exception buffer 316 and assigns it an exception pointer. The exception pointer points to the oldest exception queued in the exception buffer 316. That is, the exception pointer identifies the current oldest exception instruction that is blocking the completion of the NTC instruction pointed to by the NTC 314. The exception unit 254 is configured to compare the NTC pointer 314 with the exception pointer. When the NTC pointer 314 is equal to the exception pointer, the exception unit 254 proceeds to process the exception instruction. Processing of the exception includes, but is not limited to, flushing the corresponding instruction, or allowing the corresponding instruction to finish according to further processing such as, for example, performing a modular arithmetic operation, or writing additional bits in one or more registers. Flushing the instruction includes flushing the individual instruction identified by the exception pointer, flushing all instructions that are younger than the instruction identified by the exception pointer, or flushing the instruction identified by the exception pointer, along with all younger instructions. Once the exception processing has been performed, the exception unit 316 outputs the captured finish report 312 to the completion stage 308, where is then stored in the completion table 253. In this manner, a completion of the exception instruction is allowed to continue in the order at which it was dispatched (assuming that instruction was not been flushed by the exception unit 254).

In some instances, multiple exceptions may be detected for instructions issued out of order. For example, the exception unit 254 may store finish report corresponding to a dispatched instruction having a programming order of 3, but then receives a finish report corresponding to an older dispatched instruction having an earlier programming order of 2 (i.e., an instruction that was dispatched prior to the stored instruction with programming order 3). In one or more embodiments, the exception unit 254 can perform various synchronizing operations based on the age or program order of the exception instructions. For example, the exception unit 254 can store the older exception instruction in the exception buffer 316 and assign a new exception pointer to the older exception instruction. Accordingly, the exception unit 254 can compare the exception pointers to the current NTC pointer 313 and select the exception instruction that has the matching exception pointer for finishing.

In another example, when an age of a most recently detected exception instruction is older than an age of an exception instruction already stored in the exception buffer 316, the exception unit 254 can insert the older exception instruction in the exception buffer 316 ahead of the previously stored exception instruction and then assign the current exception pointer to the older exception instruction.

In still another example, the exception unit 254 can flush the previously stored exception instruction from the exception buffer 316 and replace it with the older exception instruction. The exception unit 254 can then assign the older exception instruction with the exception pointer. The synchronization operations described above ensure that the current oldest exception instruction will be synchronized once its exception pointer matches the NTC pointer 313 provided by the completion stage 308.

Figure 4:
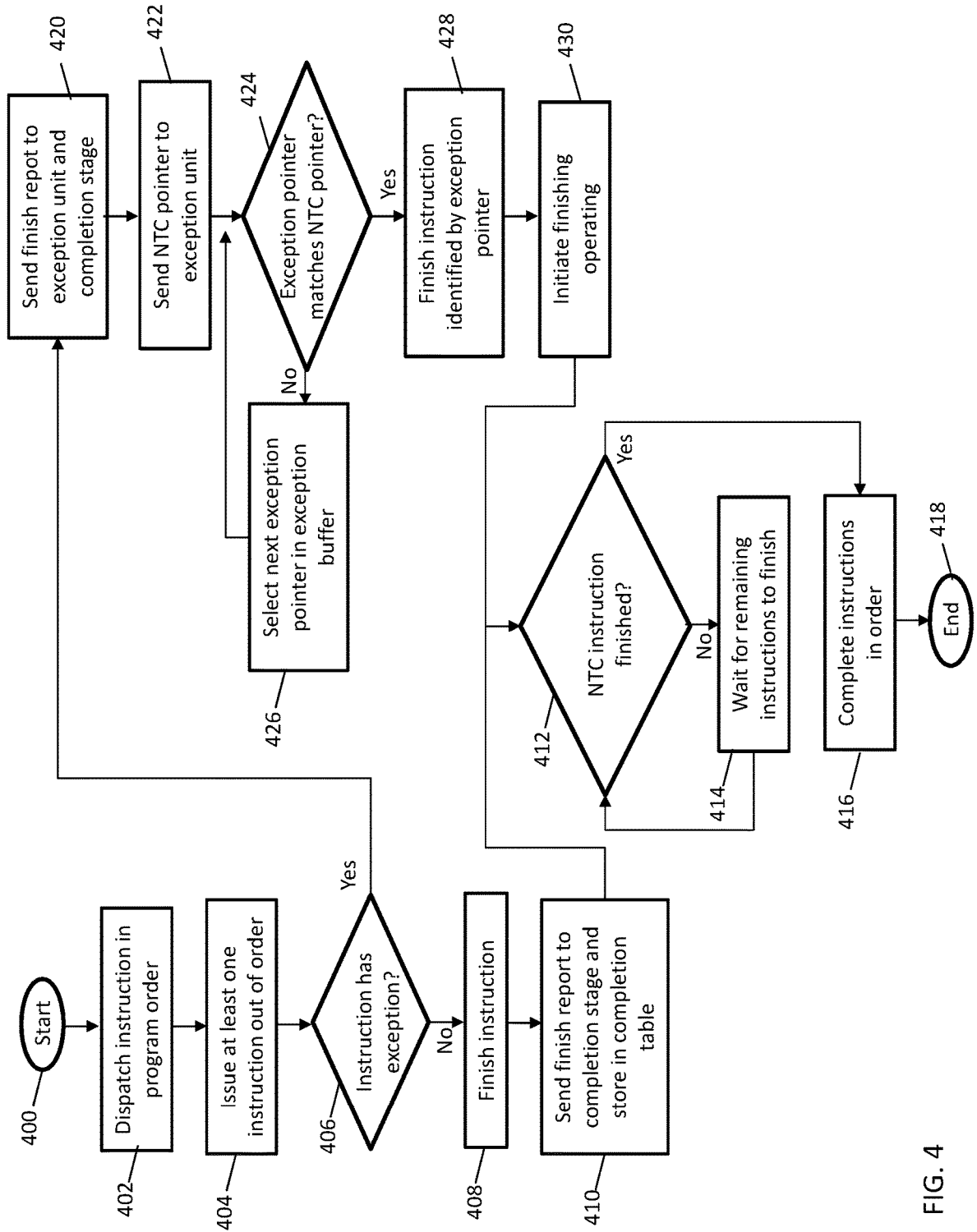
FIG. 4 is a flow diagram illustrating a method of controlling an order of an instruction pipeline of an out-of-order data processing system according to a non-limiting embodiment.

Referring now to FIG. 4, a method of processing an instruction associated with an exception is illustrated according to another non-limiting embodiment. The method begins at operation 400, and at operation 402 a plurality of instructions are dispatched in program order. At operation 404, one or more of the dispatched instructions are issued to an execution unit out-of-order with respect to the program order. At operation 406, a determination is made as to whether a currently executed instruction is associated with an exception.

When the currently executed instruction is not associated with an exception, the instruction is identified as an exception-free instruction and the exception-free instruction is finished at operation 408. At operation 410, the finish report corresponding to the exception-free instruction is delivered to a completion stage in the pipeline and an ITAG corresponding to exception-free instruction is stored in a completion table. At operation 412, a determination is made as to whether all the finish reports for all the dispatched instructions are stored in the completion table. When all the finish reports have not been received, the completion stage refrains from completing the instructions at operation 414 and returns to operation 412 to re-evaluate the completion table. When, however, the completion table contains the finish reports for all the dispatched instructions, the completion stage completes the finished instructions in order (i.e., according to the original program order) at operation 416, and the method ends at operation 418.

When, however, a currently executed instruction is associated with an exception at operation 406, an exception instruction is identified and the method proceeds to operation 420 during which the finish report corresponding to the exception instruction is delivered to an exception unit and the to the completion stage. The completion unit uses the exception indicator to block writing the finish into the completion table, and the exception logic will capture the ITAG for the finish with exception and age it against any other exceptions being processed to find the oldest per thread. The exception logic will wait until the exception is NTC and then do exception processing. Accordingly, the completion of the exception instruction is delayed.

At operation 422, the completion stage outputs a NTC pointer to the exception unit, and at operation 424 the exception unit compares the NTC pointer to one or more exception pointers assigned to corresponding exception instructions and finish reports queued in an exception buffer waiting to be finished. When a selected exception pointer does not match the NTC pointer, the exception unit selects the next exception pointer in the exception buffer at operation 426 and compares the newly selected exception pointer to the NTC pointer. Once a selected exception pointer matches the NTC pointer, the exception unit performs an exception processing operation at operation 428. The exception processing can include, but is not limited to, finishing the instruction so that it completes, requesting that the completion unit step through individual instructions in a completion group, or requesting a flush of either the NTC or NTC+1 instruction. At operation 430, a finishing operation is initiated. The finishing operation incudes, but is not limited to, performing one of a flush operation on the exception instruction, an modular arithmetic operation defined by the exception operation, or a writing operation to set at least one bit in one or more registers according to the exception operation. In addition, the exception unit can send the corresponding finish report to the completion stage where it is stored in the completion table.

As described above, a determination is made as to whether the NTC instruction is finished. In one or more embodiments, the NTC instruction is determined to be finished when the NTC instruction is finished or all instructions in the in the thread are finished. When the NTC instruction is not finished, the completion stage refrains from completing the instructions at operation 414 and returns to operation 412 to re-evaluate the completion table. When, however, the NTC is finished and the completion table contains the finish reports for all the dispatched instructions, the completion stage completes the finished instructions in order (i.e., according to the original program order) at operation 416, and the method ends at operation 418.

As described herein, various non-limiting embodiments provide a multi-threaded out-of-order superscalar microprocessor system configured to execute a pipeline order that allows an instruction to architecturally complete before starting instruction execution. For example, the multi-threaded out-of-order superscalar microprocessor system can implement an out-of-order pipeline that is effectively routed from the dispatch stage directly to the in-order completion stage. Accordingly, the out-of-order pipeline essentially routes the start of the execution pipeline to the tail end of the pipeline (i.e., to the completion stage, and in-order execution stage). In addition, the out-of-order processing system described herein avoids allocating out-of-order resources for sequences of serialized complex instructions. Instead, the out-of-order processing system described herein can force instructions to execute in-order and without the need to use out-of-order resources.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, unit, stage, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

As used herein, the term "module" or "unit" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, stage, unit, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for controlling an order of an instruction pipeline of an out-of-order data processing system, the method comprising:
 dispatching, via a dispatch stage, a plurality of instructions in a program order;
 issuing, via an issue stage, at least one instruction among the plurality of instructions;
 executing, via an execution stage, the at least one instruction to generate a finish report, and determining the at least one instruction is one of an exception-free instruction or an exception instruction;
 in response to determining the exception-free instruction, outputting a first finish report associated with the exception-free instruction to a completion stage; and
 in response to determining the exception instruction, outputting a second finish report associated with the exception instruction to an exception unit so as to halt output of the second finish report to the completion stage.

2. The computer-implemented method of claim 1, wherein the at least one instruction is issued out-of-order with respect to the program order.

3. The computer-implemented method of claim 1, wherein halting the output of the second finish report delays completion of the exception instruction.

4. The computer-implemented method of claim 3, wherein halting the output of the finish report comprises:
 queuing the second finish report in an exception buffer;
 assigning an exception pointer to the second finish report queued in the exception buffer;
 generating a next-to-complete (NTC) pointer indicating a NTC instruction included in an instruction completion table; and
 performing, via the execution unit, a finishing operation on the exception instruction in response to the exception pointer matching the (NTC) pointer.

5. The computer-implemented method of claim 4, further comprising completing, via the completion stage, the exception instruction after the finishing operation is completed.

6. The computer-implemented method of claim 5, wherein the finishing operation comprises:
 performing one of a flush operation on the exception instruction, an modular arithmetic operation defined by the exception operation, or a writing operation to set at least one bit in one or more registers according to the exception operation; and
 outputting the second finish report from the exception unit in response to completing the finishing operation.

7. The computer-implemented method of claim 6, further comprising completing the exception instruction, via the completion stage, in response to receiving the second finish report from the exception unit.

8. A computer system comprising:
 a dispatch stage configured to dispatch a plurality of instructions in a program order;
 an issue stage configured to issue at least one instruction among the plurality of instructions; and
 an execution stage configured to execute the at least one instruction to generate a finish report, and to determine the at least one instruction is one of an exception-free instruction or an exception instruction,
 wherein in response to determining the exception-free instruction, a first finish report associated with the exception-free instruction is output to a completion stage; and
 wherein in response to determining the exception instruction; a second finish report associated with the exception instruction is output to an exception unit so as to halt output of the second finish report to the completion stage.

9. The computer system of claim 8, wherein the at least one instruction is issued out-of-order with respect to the program order.

10. The computer system of claim 8, wherein halting the output of the second finish report delays completion of the exception instruction.

11. The computer system of claim 10, wherein halting the output of the finish report comprises:
 queuing the second finish report in an exception buffer;
 assigning an exception pointer to the second finish report queued in the exception buffer;
 generating a next-to-complete (NTC) pointer indicating a NTC instruction included in an instruction completion table; and
 performing, via the execution unit, a finishing operation on the exception instruction in response to the exception pointer matching the (NTC) pointer.

12. The computer system of claim 11, further comprising completing, via the completion stage, the exception instruction after the finishing operation is completed.

13. The computer system of claim 12, wherein the finishing operation comprises:
 performing one of a flush operation on the exception instruction, an modular arithmetic operation defined by the exception operation, or a writing operation to set at least one bit in one or more registers according to the exception operation; and
 outputting the second finish report from the exception unit in response to completing the finishing operation.

14. The computer system of claim 13, further comprising completing the exception instruction, via the completion stage, in response to receiving the second finish report from the exception unit.

15. A computer program product to control a computer system to control an order of an instruction pipeline of an out-of-order data processing system, the computer program product comprising a computer readable storage medium having program instructions embodied therewith, the program instructions executable by an electronic computer processor to control the computer system to perform operations comprising:
 a dispatch stage configured to dispatch a plurality of instructions in a program order;
 an issue stage configured to issue at least one instruction among the plurality of instructions; and
 an execution stage configured to execute the at least one instruction to generate a finish report, and to determine the at least one instruction is one of an exception-free instruction or an exception instruction,
 wherein in response to determining the exception-free instruction, a first finish report associated with the exception-free instruction is output to a completion stage; and
 wherein in response to determining the exception instruction; a second finish report associated with the exception instruction is output to an exception unit so as to halt output of the second finish report to the completion stage.

16. The computer program product of claim 15, wherein the at least one instruction is issued out-of-order with respect to the program order.

17. The computer program product of claim 15, wherein halting the output of the second finish report delays completion of the exception instruction.

18. The computer program product of claim 17, wherein halting the output of the finish report comprises:
- queuing the second finish report in an exception buffer;
- assigning an exception pointer to the second finish report queued in the exception buffer;
- generating a next-to-complete (NTC) pointer indicating a NTC instruction included in an instruction completion table; and
- performing, via the execution unit, a finishing operation on the exception instruction in response to the exception pointer matching the (NTC) pointer.

19. The computer program product of claim 18, further comprising completing, via the completion stage, the exception instruction after the finishing operation is completed.

20. The computer program product of claim 19, wherein the finishing operation comprises:
- performing one of a flush operation on the exception instruction, an modular arithmetic operation defined by the exception operation, or a writing operation to set at least one bit in one or more registers according to the exception operation;
- outputting the second finish report from the exception unit in response to completing the finishing operation; and
- completing the exception instruction, via the completion stage, in response to receiving the second finish report from the exception unit.

* * * * *